(12) United States Patent (10) Patent No.: US 12,583,500 B2
Mazure et al. (45) Date of Patent: Mar. 24, 2026

(54) PLASTIC COATED STEERING SHAFT ASSEMBLY AND LASER ABLATION METHOD OF MANUFACTURING

(71) Applicant: Steering Solutions IP Holding Corporation, Saginaw, MI (US)

(72) Inventors: Kyle R. Mazure, Saginaw, MI (US); Harold J. Nelson, Standish, MI (US); Lee J. Stoeckl, Mount Morris, MI (US); Adam J. Ross, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/889,513

(22) Filed: Sep. 19, 2024

(65) Prior Publication Data

US 2026/0077800 A1 Mar. 19, 2026

(51) Int. Cl.
| | |
|---|---|
| *B62D 1/16* | (2006.01) |
| *B23K 26/352* | (2014.01) |
| *B23K 101/00* | (2006.01) |

(52) U.S. Cl.
CPC ............ *B62D 1/16* (2013.01); *B23K 26/3584* (2018.08); *B23K 2101/006* (2018.08)

(58) Field of Classification Search
CPC ... B62D 1/16; B62D 1/02; B62D 1/18; B23K 26/3584; B23K 2101/006; B60R 21/05
See application file for complete search history.

(56) References Cited

U.S. PATENT DOCUMENTS

| | | | | |
|---|---|---|---|---|
| 4,552,544 A | * | 11/1985 | Beckman | .................. F16D 3/06 |
| | | | | 464/181 |
| 11,065,719 B2 | * | 7/2021 | Sabau | .................. B23K 26/082 |
| 2006/0130309 A1 | * | 6/2006 | Keller | ....................... F16C 3/03 |
| | | | | 29/558 |
| 2021/0221424 A1 | * | 7/2021 | Kamitani | ............ F16H 57/0427 |

FOREIGN PATENT DOCUMENTS

| | | | | | |
|---|---|---|---|---|---|
| EP | 1704938 A1 | * | 9/2006 | ............. | B21D 15/02 |
| EP | 2282071 A2 | * | 2/2011 | ............. | F16C 3/035 |
| FR | 2709462 A1 | * | 3/1995 | ............. | B62D 1/16 |
| JP | 5098377 B2 | * | 12/2012 | | |
| WO | WO-2020081323 A1 | * | 4/2020 | | |

OTHER PUBLICATIONS

Kurokawa, JP-5098377-B2, Machine Translation of Specification (Year: 2012).*
Affolderbach, FR-2709462-A1, Machine Translation of Specification (Year: 1995).*

* cited by examiner

*Primary Examiner* — Paul N Dickson
*Assistant Examiner* — Matthew Joseph Ganci
(74) *Attorney, Agent, or Firm* — Dickinson Wright PLLC

(57) ABSTRACT
A steering shaft assembly for a vehicle steering system includes an inner shaft having an interface portion of an outer surface of the inner shaft, wherein the interface portion is roughened with a laser ablation process. The steering shaft assembly also includes an outer shaft defining a bore which receives a portion of the inner shaft therein. The steering shaft assembly further includes a plastic material disposed directly on a portion of the outer surface of the inner shaft without an intermediate material or agent between the plastic material and the outer surface.

3 Claims, 3 Drawing Sheets

PLASTIC COATED STEERING SHAFT ASSEMBLY AND LASER ABLATION METHOD OF MANUFACTURING

FIELD OF THE INVENTION

The embodiments disclosed herein relate to vehicle steering systems and, more particularly, a steering shaft assembly having a plastic coating, as well as a method of manufacturing steering shaft assemblies with a laser ablation process.

BACKGROUND

Steering systems include a steering shaft assembly which connects a steering input device (e.g., steering wheel) to an output component or assembly to carry out steering maneuvers for a vehicle. The steering shaft assembly typically includes multiple segments which are operatively coupled to each other with various connections.

Steering shaft friction sliding joints typically rely on a plastic-to-metal interface to create a torsionally rigid—and a low axial sliding force-joint. To apply the plastic to the inner shaft, a dip process is often used which requires a heated inner shaft to be dipped into powdered plastic, which melts the plastic onto the shaft. The plastic powder that is used in this interface must be sufficiently adhered to the inner shaft to prevent the plastic from peeling or delaminating, which would result in a low performance joint.

There are a few different methods used to sufficiently adhere the plastic powder material to the metal shaft. One common method is the use of a primer bonding agent which is applied to the inner shaft and cured before the plastic is applied. The use of primer adds additional processing steps and requires the use of the separate primer material. Another method to adhere plastic to the metal shaft is the use of a phosphate coating on the inner shaft. This method requires fewer processing steps than primer, but it is still another material that needs to be applied to the shaft prior to the plastic being applied, which increases assembly cost and increases the number of materials.

SUMMARY

According to one aspect of the disclosure, a steering shaft assembly for a vehicle steering system includes an inner shaft having an interface portion of an outer surface of the inner shaft, wherein the interface portion is roughened with a laser ablation process. The steering shaft assembly also includes an outer shaft defining a bore which receives a portion of the inner shaft therein. The steering shaft assembly further includes a plastic material disposed directly on a portion of the outer surface of the inner shaft without an intermediate material or agent between the plastic material and the outer surface.

According to another aspect of the disclosure, a method of manufacturing a steering shaft assembly is provided. The method includes roughening an interface portion of an outer surface of an inner shaft with a laser ablation process. The method also includes applying a plastic material directly to the interface portion of the inner shaft without an intermediate material or agent between the plastic material and the outer surface. The method further includes positioning the interface portion of the inner shaft within a bore defined by an outer shaft to secure the inner shaft and the outer shaft together.

According to another aspect of the disclosure, a method of manufacturing a steering shaft assembly is provided. The method includes applying a plastic material directly to an interface portion of an outer surface of an inner shaft without an intermediate material or agent between the plastic material and the outer surface, wherein the plastic material is not applied with an injection molding process. The method also includes positioning the interface portion of the inner shaft within a bore defined by an outer shaft to secure the inner shaft and the outer shaft together.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
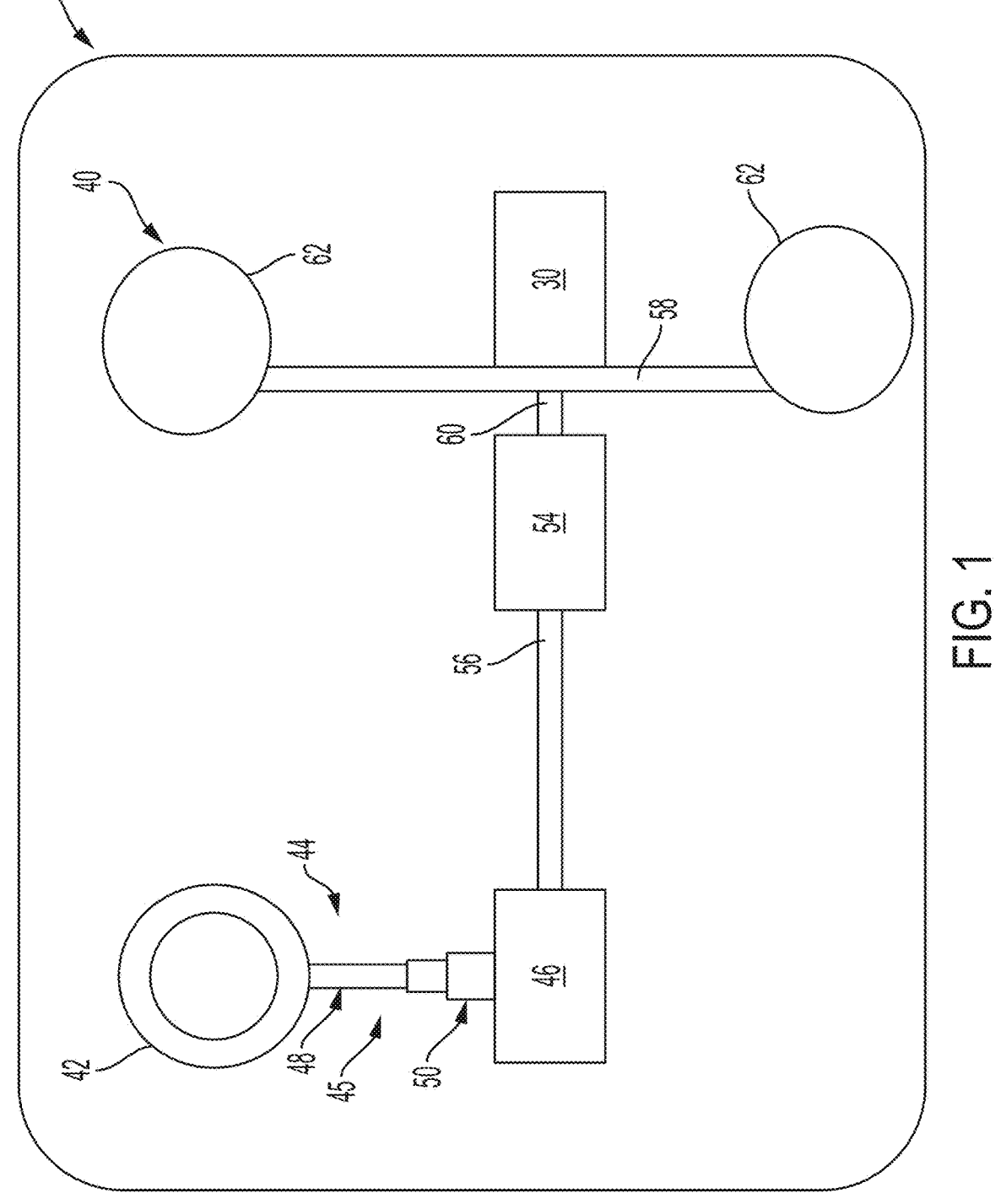
FIG. 1 is a schematic illustration of a vehicle steering system.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other vehicles. The vehicle 20 may include a propulsion system 30, such as an ignition system, an electronic system, or combinations thereof.

The vehicle 20 further includes a steering system 40. The steering system 40 may be configured as a driver interface steering system, an autonomous driving system, or a system that allows for both driver interface and autonomous steering. The steering system 40 may include an input device 42, such as a steering wheel, wherein a driver may mechanically provide a steering input by turning the steering wheel. A steering column assembly 44 includes a steering column 45 that extends along an axis from the input device 42 to an output assembly 46. The output assembly 46 may include a pinion shaft assembly, an I-shaft, a cardan joint, steer-by-wire components or any feature conventionally located opposite the input device 42.

The steering column 45 includes one or more axially adjustable portions, for example, an upper jacket 48 and a lower jacket 50 that are axially adjustable with respect to one another. It is contemplated that additional jackets are utilized in some embodiments. It is to be appreciated that other structural features of the steering column 45 may be part of the upper jacket 48 and the lower jacket 50, such as brackets, rails, other devices, or combinations thereof.

The steering column 45 is moveable over a range of positions from a fully extended position to a fully retracted position. In the fully extended position, the upper jacket 48 and the lower jacket 50 are moved axially so that the input device 42 is located near an operator of the vehicle. In the retracted position, the upper jacket 48 and the lower jacket 50 are moved axially so that the input device 42 is located further away from an operator of the vehicle, when compared to the extended position. In some embodiments, the retracted position may correspond to stowing the input device 42. For example, it may be beneficial to place the input device 42 in a stowed location during autonomous driving. In operation, the axial movement of the upper jacket 48 and the lower jacket 50 may be effectuated by manual movement by an operator or electromechanically by a telescope or translation actuator. This axial movement adjusts between the extended position, the retracted position, and any intermediary positions.

A steering gear assembly 54, the output assembly 46 and the steering input device 42 may be connected via a steering shaft assembly 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear and/or various traditional components. The output shaft 60 is operably connected to the steering gear assembly 54 such that a rotation of the steering shaft assembly 56 causes a responsive movement of the output shaft 60 and causes the drive axle to turn wheels 62. It is to be appreciated that the steering components described herein may be part of a steer-by-wire system or one which includes a direct mechanical linkage over the span of the components.

Figure 2:
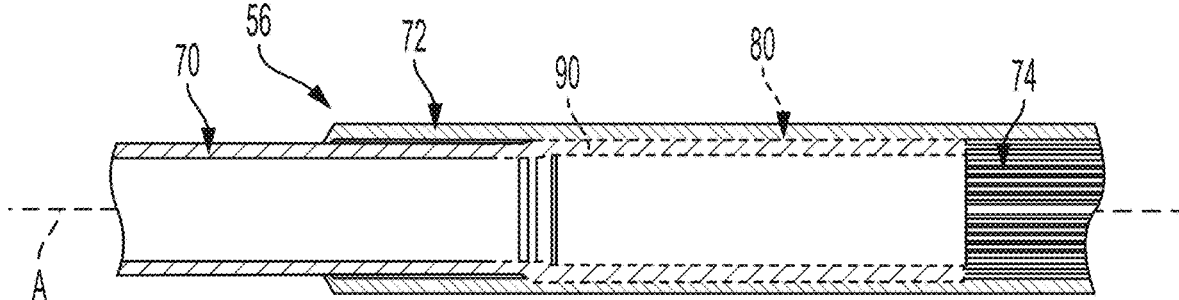
FIG. 2 is an elevation, cross-sectional view of a steering shaft assembly in the vehicle steering system.

Referring now to FIG. 2, a portion of the steering shaft assembly 56 is illustrated in greater detail. The steering shaft assembly 56 includes a first shaft, which is an inner shaft 70, and a second shaft, which is an outer shaft 72. The inner shaft 70 is inserted within a bore 74 defined by the outer shaft 72. The inner shaft 70 and the outer shaft 72 are connected to each other in a manner which allows the two shafts to rotate in a corresponding manner with each other. The coupling may be made via a splined connection with splines on an outer surface of the inner shaft 70 and splines on an inner surface of the outer shaft 72. However, it is also contemplated that one or more mechanical fasteners may be utilized to secure the shafts 70, 72 to each other. Regardless of the type of connection used to maintain common rotation between the shafts 70, 72, the inner shaft 70 is in axial overlap with the outer shaft 72 and the shafts 70, 72 extend longitudinally along a longitudinal axis A of the overall steering column 45.

Figure 3:
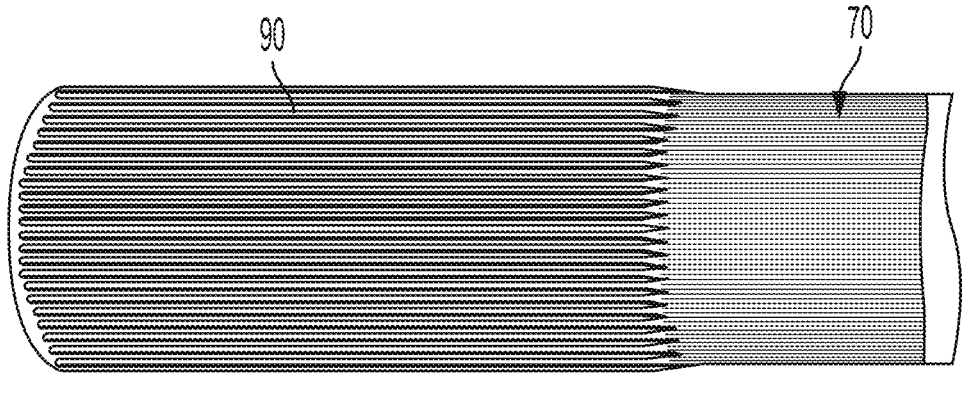
FIG. 3 is a perspective view of a portion of an inner shaft of the steering shaft assembly after being subjected to a laser ablation process.
Figure 4:
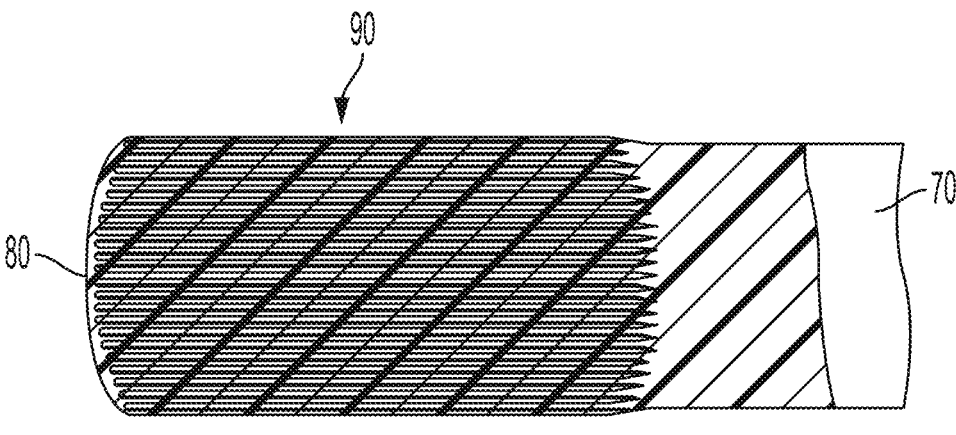
FIG. 4 is a perspective view of the portion of the inner shaft after having a plastic coating applied thereto.

Referring now to FIGS. 3 and 4, a portion of the inner shaft 70 is shown in greater detail. In particular, FIG. 3 illustrates a portion of the inner shaft 70 after having a manufacturing process performed on it, while FIG. 4 shows the portion of the inner shaft 70 after being coated with a plastic material 80. The plastic material 80 provides a plastic-to-metal interface between the inner shaft 70 and the outer shaft 72 to create a torsionally rigid—and low axial sliding force-joint. In particular, the outer shaft 72 is formed of metal and is not coated with plastic, but interfaces with the plastic material 80 on the inner shaft 70 when assembled together as the steering shaft assembly 56.

The post-manufacturing process view of the inner shaft 70 in FIG. 3 illustrates an interface portion 90 of the inner shaft 70 which is to be in contact with the outer shaft 72. The manufacturing process which the interface portion 90 of the inner shaft 70 is subjected to is an ablation process. The ablation process is done by laser etching the surface of the interface portion 90 of the inner shaft 70 which is formed of metal. The laser ablation process causes the surface of the interface portion 90 of the inner shaft 70 to be roughened. In other words, the interface portion 90 is not smooth (e.g., "bumpy"). In some embodiments, the roughness is equal or greater than about Ra 3.5 micrometers. This roughened surface of the interface portion 90 provides the needed surface area and grip that allows the plastic material 80 (FIG. 4) to adhere to the metal of the inner shaft 70.

Once the laser ablation process is completed on the interface portion 90 of the inner shaft 70, the interface portion 90 is dipped into a powder plastic without the use of a secondary bonding agent. The plastic material 80 is applied to the interface portion 90 with a process referred to as powder plastic material adhesion. The plastic material 80 is not applied with an injection molding process which adds complexity and cost to the process and assembly disclosed herein.

The laser ablation process does not require an additional, or intermediate, material for the plastic to adhere to, thereby reducing the overall cost of the steering shaft assembly 56. The required laser and equipment is easy to maintain and can be precisely controlled. The laser ablation process may be done quickly and is easily integrated into a one-piece flow process with minimal opportunity for manufacturing issues.

By way of non-limiting example, a pulsing type of laser may be used with a pulse duration ranging from about 1 femtosecond (1e-15 second) to 1 millisecond (1e-3 second). If a non-pulsing laser is used this parameter does not apply. The laser beam speed or laser speed can range from 1 mm/s to 50 m/s.

The plastic material 80 may be any suitable material which may be broadly categorized as plastic, including polymers, for example.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of manufacturing a steering shaft assembly comprising:

applying a plastic material directly to an interface portion of an outer surface of an inner shaft without an intermediate material or agent between the plastic material and the outer surface, wherein the plastic material is not applied with an injection molding process;

roughening the interface portion with a laser ablation process prior to applying the plastic material directly on the interface portion, wherein the roughness value of the interface portion is equal or greater than 3.5 micrometers; and positioning the interface portion of the inner shaft within a bore defined by an outer shaft to secure the inner shaft and the outer shaft together, wherein the inner shaft and the outer shaft are formed of metal, wherein the laser is a pulsing type of laser that operates with a pulse duration ranging from about 1 femtosecond to 1 millisecond.

2. The method of claim 1, wherein the plastic material is applied to the interface portion with a powder plastic material adhesion process.

3. The method of claim 1, wherein the interface portion includes a plurality of circumferentially spaced splines which interface with corresponding splines of the outer shaft.

* * * * *